Aug. 8, 1939. W. A. PARR 2,168,773
HAMBURGER FRYING MACHINE
Filed July 26, 1937 4 Sheets-Sheet 1

Inventor:
Webster A. Parr
By John F Brezina
Atty

Inventor:
Webster A. Parr
By John F. Brezina
Atty.

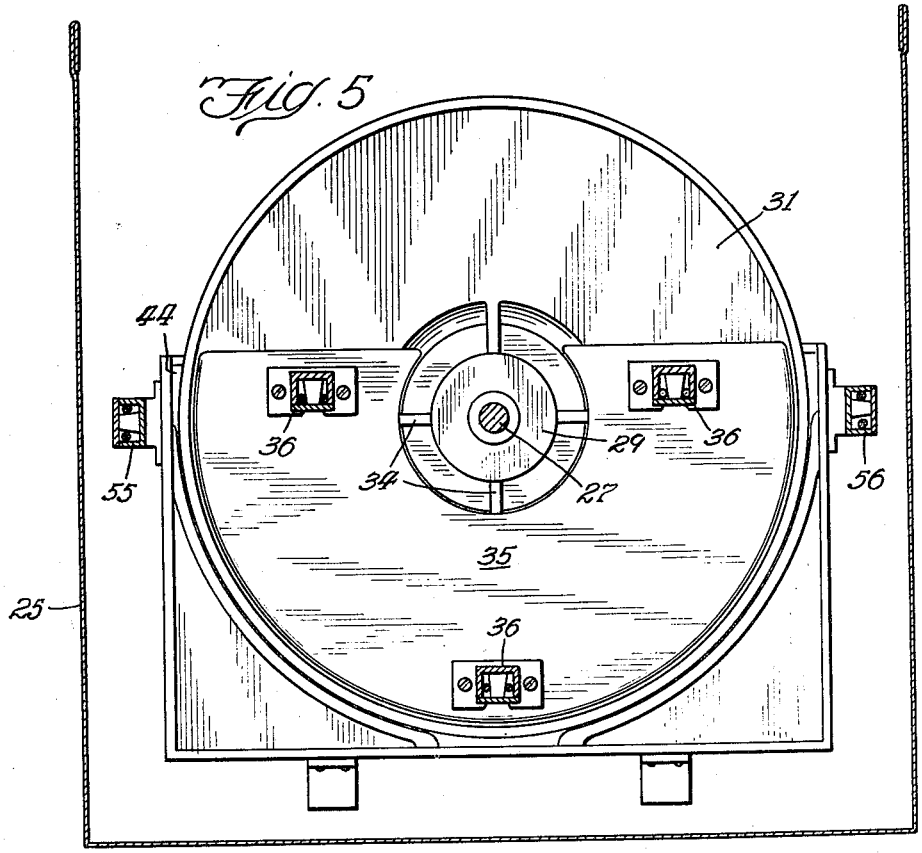
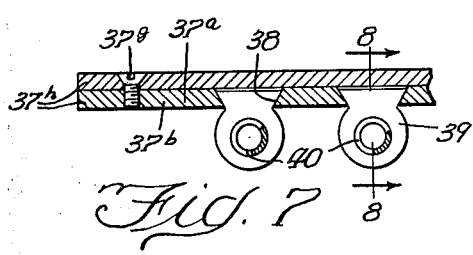
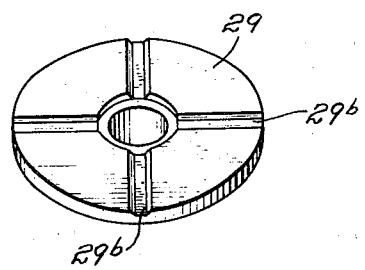
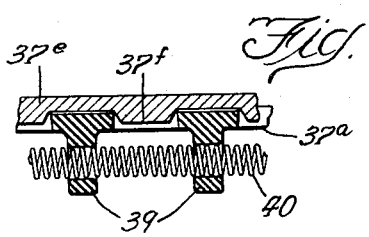

Patented Aug. 8, 1939

2,168,773

UNITED STATES PATENT OFFICE 2,168,773

HAMBURGER FRYING MACHINE

Webster A. Parr, Chicago, Ill., assignor to The Roto-Way Corporation, Chicago, Ill., a corporation of Illinois; Fred E. Hummel, trustee Application July 26, 1937, Serial No. 155,657

15 Claims. (Cl. 219—19)

This invention is directed to and covers a hamburger frying machine having a power driven rotatable turn-table or hot plate which is automatic in operation, and which has a plurality of electrical heating elements positioned in close proximity below the rotatable hot plate which heating elements are disposed immediately under a sector of the hot plate.

An important object of my invention is the provision of a portable inexpensively operated, inexpensive hamburger frying machine, which is preferably in the form of a conventional cabinet with the principal operating parts exposed and easily accessible for sanitary reasons; which has an electric motor driving mechanism manually controllable by the operator; and which has a rotatable hot plate removably mounted with respect to the driving mechanism.

A further important feature of my invention is the provision of a hamburger frying machine having a removably and rotatably mounted hot plate, motor driving means therefor and slip clutch mechanism between the driving means providing for manual and forced rotation of the hot plate in either direction regardless of the operation of the motor and driving mechanism, thereby permitting quick and easy variation in the time during which the material to be fried is subjected to the heating elements.

A further important object of my invention is the provision of a hamburger frying machine having a rotatable turn-table or hot plate; and having two or more heating elements mounted immediately under and adjacent to the hot plate and two or more heating elements mounted and wired in circuit immediately above said hot plate; each of said heating elements comprising a removably and easily replaceable and mountable unit, each of which carries a continuous electrical resistance wire unit connected in circuit with a source of electric power.

A further object of my invention is the provision of an inexpensive, practical arcuate heating unit adapted to be mounted in close proximity with a rotatable hot plate or grill which includes a slotted metal rack member having a plurality of bevelled grooves therein, a plurality of mounting hangers slidable and replaceable and removable from the grooves of said rack, said hangers being adapted to carry the electrical resistance wire.

A further object of my invention is the provision, in combination with a frying machine having a rotatable hot plate and power driving mechanism therefor, of an auxiliary heating compartment adapted for use in heating and retaining heated articles of food requiring lower degrees of heat than the hot plate, and heat-retaining and protecting cover means over a portion of said hot plate providing mounting means for individual heating elements which are exposed to and in close proximity to the articles to be fried.

Other and further important objects of my invention will be apparent from the following description and claims.

This invention (in preferred form) is illustrated in the drawings and hereinafter more fully described.

On the drawings:

Fig. 5 is a partially cross sectional view and partially top plan view taken on line 5—5 of Fig. 3.

Fig. 6 is a perspective and enlarged view of the clutch plate forming an important part of my invention.

Fig. 7 is an enlarged fragmentary and cross sectional view of a portion of one of the heating elements and mounting means therefor.

Fig. 8 is an enlarged fragmentary cross sectional view taken on line 8—8 of Fig. 7.

Figure 1:
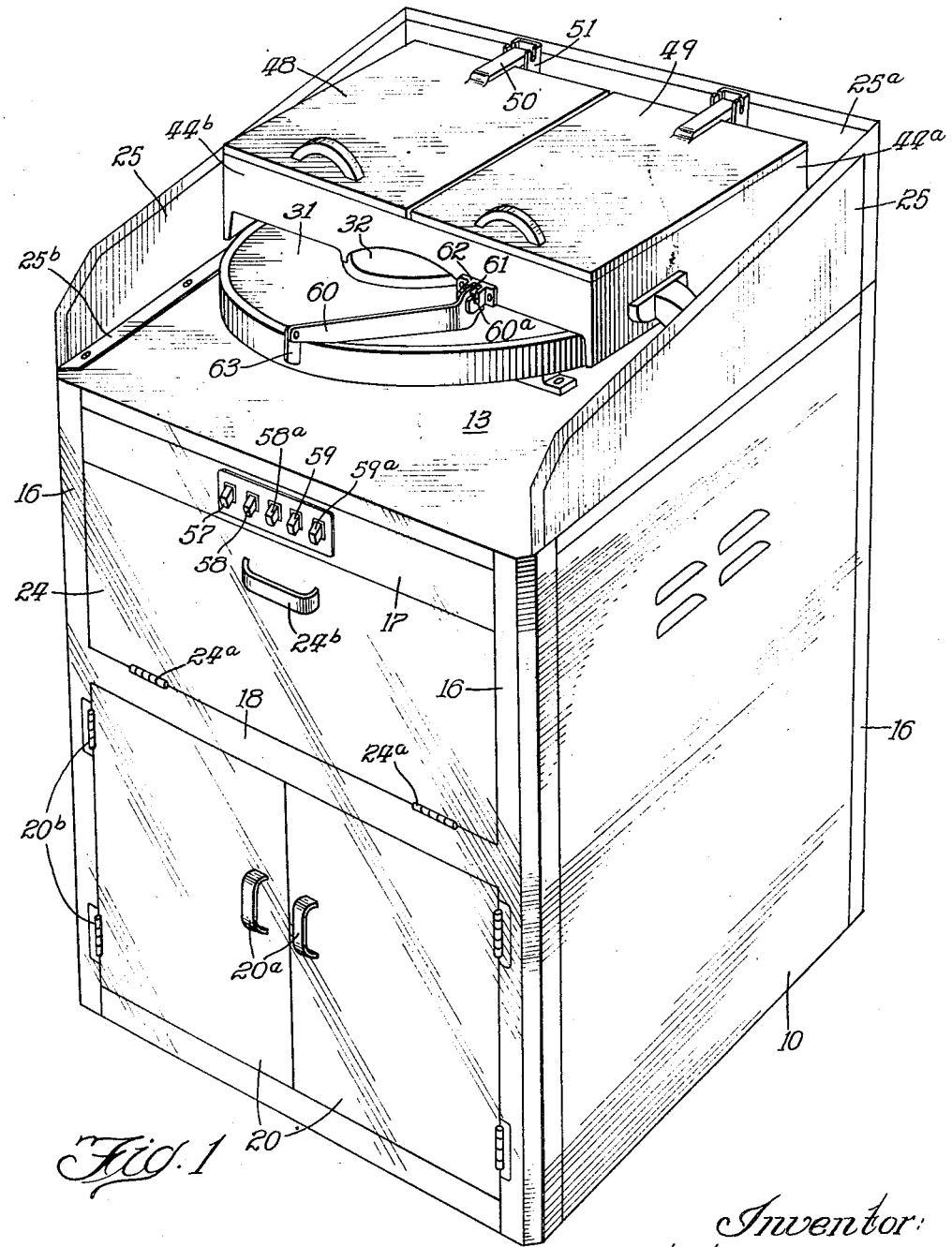
Fig. 1 is a perspective view of the exterior of the finished cabinet and hamburger frying machine of my invention.

The housing or cabinet which is best illustrated in Fig. 1 of the drawings comprises opposite sheet metal side walls 10, rear metal wall 11, substantially horizontal metal bottom 12 and substantially horizontal metal top wall or ceiling 13, all of which are secured together by any suitable well known means such as welding to form a substantial cubical unit or cabinet, as clearly shown in the drawings. It will be noted that the upper edge of the side walls 10 is preferably bent perpendicularly, at which point the same is spot-welded or otherwise suitably secured to top wall or ceiling 13, and that bottom panel or wall 12 has its lateral edges also bent perpendicularly to form flanges 12a to form convenient welding surfaces whereby the same are easily and respectively secured to side panels 10 and rear panel 11. The lower ends of said side walls 10 and rear wall 11 extend substantially below bottom 12, as at 12b in Fig. 2, to provide for convenient mounting on the inside surface thereof and at the respective corners of the cabinet, of U-shaped brackets 14 which have suitable journalled therein in the upper ends of conventional casters 15, as clearly illustrated in Fig. 2. The aforesaid mounting of the cabinet and supported parts on caster wheels as aforesaid provides for convenient portability of the unit. A plurality of metal reinforcing angles 16 are secured by welding or the like along and over the respective vertical corners of the cabinet to add strength thereto and to present a more finished and perfect appearance.

The front of the cabinet includes an upper metal channel 17 of U-shaped cross section, an intermediate U-shaped channel 18 and lower or bottom sheet metal member 19, the opposite ends of each of which are secured by welding or the like to the corner metal reinforcing members 16. Said channel members 17, 18 and 19 are preferably parallel and spaced apart in substantially the relative position illustrated in Fig. 1.

The forward side of the housing cabinet further includes a pair of opposed and adjacent doors 20 having suitable handles 20a secured thereon and each of which have a pair of hinges 20b secured to one outer edge respectively and which hinges are suitably secured, by welding or equivalent means, to the lateral edges respectively of angular corner member 16. An intermediate metal partition wall 21 is secured in horizontal position in the cabinet substantially midway between the top and bottom and divides said cabinet into two principle compartments, as clearly illustrated in Fig. 2. The peripheral edges of partition wall 21 is bent perpendicular and suitably secured, as by welding, to the opposite side walls 10 and rear wall 11. Doors 20 provide convenient closure and access means to the lower compartment and are indicated by the reference numeral 22.

The upper compartment, indicated by the reference numeral 23 and which extends between partition walls 21 and top 13, has front closure means in the form of a metal door 24 having spaced apart hinges 24a securing its lower edge to the upper edge of U-shaped channel 18, and also has a suitable handle 24b to permit convenient vertical pivoting of said door.

Figure 2:
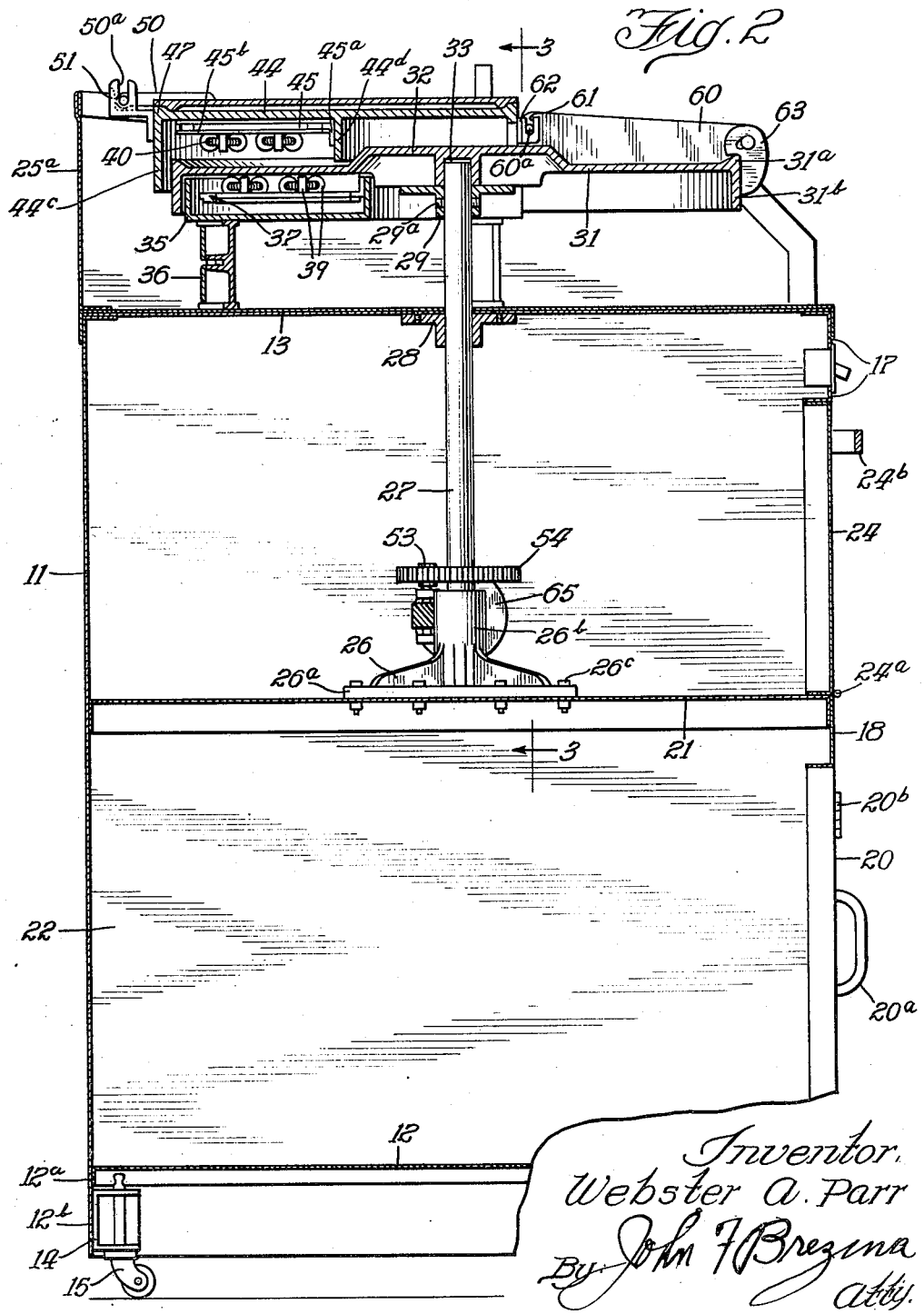
Fig. 2 is a cross sectional view of my hamburger frying machine taken through the center of Fig. 1 and showing the front of the machine at the right.
Figure 3:
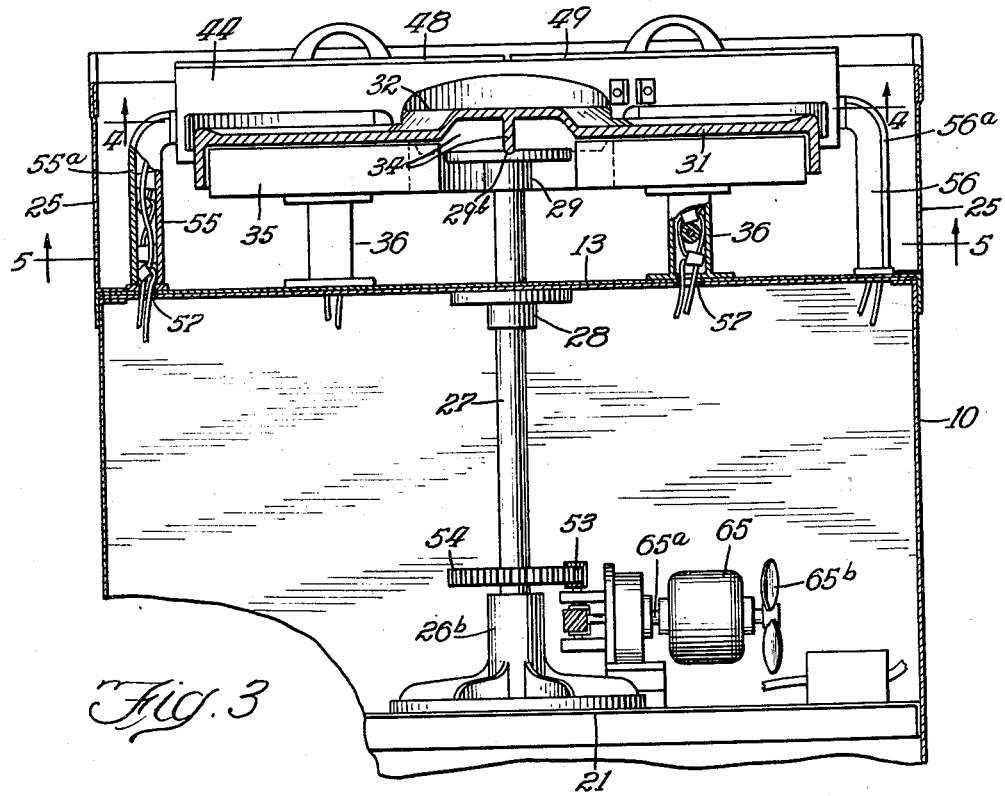
Fig. 3 is a cross sectional view and partially side elevational view of my invention taken on line 3—3 of Fig. 2.

Secured along the opposite side edges and the back edge of the top 13 are opposite metal aprons or guards 25 joined along the rear edge of said top by rear apron or guard 25a, said aprons or guards having perpendicular flanges along the lower edges which are removably secured upon the cabinet by screws or the like and in substantial alignment with the sides and back thereof and as clearly illustrated in Figs. 1, 2 and 3.

While I have in the foregoing described a desirable form of housing or cabinet for my meat frying machine, it is to be borne in mind that the cabinet per se may be of various sizes, proportions, forms and modifications to suit desired tastes or convenience without departing from the essential features of my invention.

A metal spider 26 having a flat apertured base 26a and integral journalling boss 26b is mounted upon the intermediate partition wall 21 and secured thereon by suitable bolts 26c, as clearly shown in Fig. 2. Said boss 26b has an upwardly opening aperture in which is journalled the lower end of a vertical shaft 27 and which extends through a suitable aperture in wall 13 and substantially thereabove, as clearly indicated in Figs. 2 and 3. Said shaft 27 is journalled in a suitable bearing 28 where it passes through top wall 13, which bearing 28 is secured to said top wall by suitable screws, as shown in Fig. 2.

The upper and projecting end of the shaft 27 has secured thereon a short distance below its upper end a clutch plate 29 by means of a suitable set screw 29a. Clutch plate 29 has a plurality of radially extending bevelled grooves 29b, preferably four in number, formed in its upper surface, which grooves releasably engage depending flanges of a hot plate hub hereinafter described.

The reference numeral 31 indicates a relatively large metal disc, preferably made of metal of heat-retaining composition and of sufficient weight, and which disc or hot plate has an upwardly off-set central integral hub 32 which in turn has downwardly opening aperture 33 which normally seats over and receives the upper end shaft 27. Said hub 32 also has a plurality of integral radially extending depending flanges 34 which are preferably at 90 degrees from each other, and which correspond in number to the radial grooves 29b of clutch plate 29, and which are clearly shown in Fig. 5 of the drawings. When the disc or hot plate 31 is removably positioned on the upper end of shaft 27 and slightly rotated, radial grooves 29b of clutch plate 29 removably receive the lower peripheries of flanges 34, though permitting selective and manual rotation of the hot plate 31 in either direction regardless of operation or non-operation of the driving and rotating mechanism.

As is clearly shown in the drawings, said disc-like hot plate 31 has a relatively short upwardly extending integral grease-retaining flange 31a and a peripheral integral downwardly extending skirt or flange 31b, the function of the latter being to obstruct the escape of heat from the heating elements mounted under said hot plate and to act as a guard therefor.

A semi-circular relatively wide metal receptacle or channel 35, clearly shown in Figs. 2 and 3, forms a supporting and retaining receptacle for the heating units or heating elements of the hot plate, and said channel is mounted immediately below that half portion of the hot plate which is nearest the rear of the cabinet. Said receptacle 35 is supported in said position by a plurality of hollow metal supporting members 36.

Figure 4:
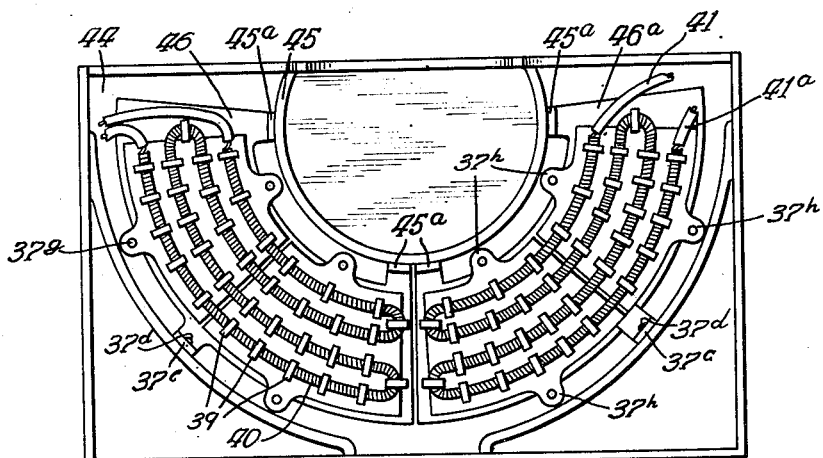
Fig. 4 is an enlarged view looking from the bottom and at the cover means and upper heating elements and taken on line 4—4 of Fig. 3.

A pair of arcuate metal electrical heating units, only one of which is shown in side elevation in Fig. 2 and indicated by reference numeral 37, are mounted in end to end relation in said arcuate receptacle 35 in a manner and position similar to that illustrated in Fig. 4. However, Fig. 4 illustrates the upper heating units and mounting means thereof which are to be described hereinafter. Each of said heating units comprises a metal rack 37a having a plurality of arcuate substantially parallel grooves 38 therein which are illustrated in cross section in Fig. 7. Each said racks also has a plurality of integral right-angled brackets 37c forming means for mounting the racks and heating units, as by bolts 37d, to the depending flanges or skirts 44c and 44d of the upper metal receptacle and to upwardly extending outer and inner flanges of arcuate receptacle 35.

Each said heating unit also comprises a pair of metal plates 37e which are flat on one side and have a plurality of spaced apart integral abutments 37f which act as spacers for the respective hangers, said plates being fastened flat against the slotted racks 37a by screws 37g which pass through coincident apertures in integral overlying ears 37h formed on said racks 37a and plates 37e respectively, as clearly shown in Fig. 4. In each heating unit 37 the bevelled edge of each slot is toward the respective plates 37e to provide "tongue and groove" mounting means for each of the electrical wire hangers.

Each of the resistance wire-retaining hangers, 39, illustrated in Figs. 7, 8 and 4 respectively, comprises a relatively small collar or ring of non-conductive material and having an integral square projecting boss which presents a square end surface and which is outwardly flared and bevelled on two sides as illustrated in Fig. 7. Said relatively thick boss has its other two sides cut off at right angles and narrower, as illustrated in cross section in Fig. 8. It is to be noted that each of said hanger elements are so made that they may be easily inserted or removed from engagement with the grooves 38 of plates 37 by merely rotating each thereof one-fourth of a turn and pulling the said hangers from the grooves in which they are mounted inasmuch as the length thereof, namely the distance between the two opposite straight sides, is less than the width of said grooves 38.

It is also to be noted that when the hangers 39 are similarly inserted in the grooves 38 and when rotated to the position in Fig. 7 are slidable along said grooves 38 to the respective desired spaced apart positions, as illustrated in Fig. 4. Thereupon the coiled electrical resistance wire 40 may be braided through the aligned central apertures of said hangers 39 in a circuitous and back and forth path as illustrated in Fig. 4 and so that the two terminal connections 41 and 41a may be at the same end of each of said arcuate heating elements.

As clearly shown in Figs. 1, 2, 3 and 4, a substantially rectangular flanged metal cover 44 forms substantially a housing or enclosing member for the upper heating elements to be described. Said enclosing member 44 is of a size slightly wider than the diameter of the hot plate and of slightly greater area than half of the rotatable hot plate 31. The enclosing member 44 has integral depending side walls 44a which extend a short distance below the upper periphery of the hot plate, as clearly shown in Figs. 1 and 2. Said enclosing member 44 also has a front or forward integral wall 44b and depending wall 44c, said side front and rear walls having the function of obstructing the escape of heat from the area surrounding the heating elements and from areas immediately above the surface of the hot plate, and further, of acting as the protecting guard.

As shown in Figs. 2 and 4, a pair of arcuate heating elements are mounted in said enclosing member 44, each of said heating elements being of a construction similar to the construction of the heating elements hereinbefore described as being mounted below and immediately under the hot plate 31.

As indicated in Fig. 2, it will be noted that the position of the heating element attached to flange 44d of enclosing member 44 is in close proximity with the upper surface of the rotatable hot plate and that any objects to be fried or otherwise prepared which are borne on said hot plate, will be heated both from the heating elements of the hot plate (designated by reference numerals 46, 46a), the hot plate itself and also from the upper heating elements which are secured to the enclosing member 44, as clearly shown in Figs. 2 and 3.

An important feature of construction of said heating units is their arcuate shape and the fact that the electric resistance wires extend in a direction corresponding to the path of movement of the meat or hamburger on the rotatable hot plate, thereby permitting a maximum amount of heat to contact the meat or hamburger. Variation in amount of heat to be used in any given time is also attained inasmuch as each of the arcuate heating elements have their own independent electric control switch which permits any one or more thereof to be selectively used at any given time. This also permits the operator to open all the control switches except one or two when the machine is not in active use but where at the same time it is indispensable that the hot plate be maintained sufficiently hot so that a hamburger or the like may be quickly prepared in a short interval of time when additional heating units are thrown into circuit and employed.

Another important feature of my invention is a pair of auxiliary gridirons which may be conveniently used for heating buns, bread and other products which require a lower heat intensity. These auxiliary gridirons are formed as a part of my invention by providing a pair of rectangular metal covers 48 and 49, the area of both of which covers the upper substantially flat surface of the enclosing member 44. It is to be noted that the flat upper surface of enclosing member 44 has peripheral integral flange 4 and that the covers 48 and 49 each normally rest thereon. Each said covers 48 and 49 are hingedly mounted at one edge by means of a hinge element 50 which has oppositely extending pins or studs, as shown, which pivotably and loosely engage a pair of upwardly opening recesses 50a of angular hinge brackets 51. Each of said hinge brackets 51 are slightly "Z-shaped" in side elevation as shown in Fig. 2 and the upper portions thereof are of U-shaped cross section, as clearly shown in the perspective view of Fig. 1, and so that the rear portion of said channel-like portions of hinges 51 will serve as rests and supports to maintain the covers 48 and 49 respectively in open and vertically extending position when such position is desired.

Reference numeral 65 designates an electric motor of conventional construction having its armature shaft 65a projecting in both directions, and having mounted thereon propellor 65b to cause air circulation over the motor to cool the same and armature end 65a is coupled to drive speed reducer 52, which is of conventional construction and suitable to adjacent said motor. Part of the speed reducing mechanism consists of pinion 53 and is in mesh with and drives horizontally mounted gear wheel 54, which gear wheel 54 is securely mounted on vertical shaft 27 a short distance above its lower mounting.

As clearly shown in Figs. 1, 3 and 5, the reference numerals 55 and 56 indicate hollow channel-like metal conduits which also serve as supporting standards for the inverted enclosing and supporting member 44 and attached parts, the upper end of each said conduits-supports 55 and 56 being secured by welding or equivalent means to the depending side walls or skirts 44c, as clearly shown in Figs. 1 and 3. The lower end of each said conduits and supports 55 and 56 rest upon the partition wall or top 13 and in registry with apertures therethrough, through which suitable insulated electrical wires pass from the control switches to the heating units. The left hand upper heating unit and the right hand conduit-support 56 houses and protects the wiring from the control switches to the right hand upper heating unit. As clearly shown in Fig. 3, the outer walls of each said conduits-supports 55 and 56 respectively are made removable to provide quick and easy access to connect the wiring from the heating units to the respective control switches.

The two lower arcuate heating elements hereinbefore described are connected to the respective control switches by means of suitable insulated wiring which passes respectively through suitable apertures in the top wall 13, indicated by reference numeral 57, and through relatively short tubular hollow metal supporting members 46 which likewise form conduits and enclosures for the portion of the wiring forming a part of the circuit between the control switches and the two heating elements which are mounted immediately adjacent and under the rotatable hot plate. As indicated, the hollow supporting members 46 support the semi-circular metal receptacle 35 with respect to top wall 13.

As shown in Fig. 1, the reference numeral 57 indicates a control switch preferably wired in the circuit of the electric motor 65; numerals 58 and 58a represent the manual control switches for the hot plate lower heating elements; and reference numerals 59 and 59a represent the manual control switches for the upper heating elements illustrated in Fig. 4, and each of said switches are suitably wired in the said respective circuits in a conventional manner.

A further feature of my invention is the provision of a hamburger removing arm 60 which is in the shape of an obtuse angle and which has stud pivots 60a on opposite sides of one end thereof, which removably and loosely engage in a pair of upwardly opening recesses 61 of bifurcated bracket 62 which is secured by screws or the like to the vertical forward side wall 44b. A short pivoted arm 63, is pivoted on the end of arm 60 to engage the annular peripheral edge of the hot plate, the arm 60 being normally positioned tangentially of the round hot plate and so that the hamburgers or other prepared articles emerging from beneath the upper heating elements will be slid off the hot plate either into a suitable receptacle (not shown) or upon the top 13 of the cabinet.

It will be apparent that if it is desired to fry hamburger until it is "well done" the operator may manually rotate the hot plate (such manual rotation being permitted by the slip clutch hereinbefore described) in a counterclockwise direction to thereby lengthen the time during which the hamburger is subjected to the heating elements. Conversely, the manual rotation and advance of the hot plate in the direction of its normal rotation will shorten the time during which the hamburger is fried, thereby permitting variation of frying as desired.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. A meat frying machine comprising a housing forming a cabinet or the like; an intermediate horizontally extending supporting member in said cabinet, a journalling bearing on said intermediate member; a vertically extending shaft having its lower end journalled in said bearing, the upper end of said shaft extending above said cabinet; means for journalling the upper portion of said shaft; a rotatable hot plate removably and rotatably mounted on the upper end of said shaft, said hot plate including a central flanged hub; a slip clutch on the upper end of said shaft and normally engaging said hot plate hub to transmit rotative movement thereto, said clutch permitting free manual rotation of said hot plate in either direction; electrical heating elements mounted adjacent said hot plate; means for supporting said electric heating elements adjacent to said hot plate, a cover member mounted above a portion of said hot plate; an electric motor in said cabinet; and gear reduction mechanism gearingly connecting said motor and said vertical shaft whereby said shaft and hot plate may be selectively rotated.

2. A meat frying machine comprising a housing forming a cabinet or the like; an intermediate horizontally extending supporting member in said cabinet, a journalling bearing on said intermediate member; a vertically extending shaft having its lower end journalled in said bearing, the upper end of said shaft extending above said cabinet; means for journalling the upper portion of said shaft; a rotatable hot plate removably and rotatably mounted on the upper end of said shaft, said hot plate including a central hub having depending radial flanges, a slip clutch on the upper end of said shaft, said clutch including a radially grooved bearing sleeve releasably engaging said hub flanges and permitting free manual rotation of said hot plate in either direction; electrical heating elements mounted adjacent said hot plate; means for supporting said electric heating elements adjacent to said hot plate, an arcuate cover member mounted above a portion of said hot plate; an electric motor in said cabinet; and gear reduction mechanism gearingly connecting said motor and said vertical shaft whereby said shaft and hot plate may be selectively rotated.

3. A meat frying machine comprising a housing forming a cabinet or the like; an intermediate horizontally extending supporting member in said cabinet; a journalling bearing on said intermediate member; a vertically extending shaft having its lower end journalled in said bearing, the upper end of said shaft extending above said cabinet; means for journalling the upper portion of said shaft; a rotatable hot plate removably and rotatably mounted on the upper end of said shaft, said hot plate including a central flanged hub; a slip clutch on the upper end of said shaft and normally engaging said hot plate hub to transmit rotative movement thereto, said clutch permitting free manual rotation of said hot plate in either direction; electrical heating elements mounted adjacent said hot plate; stationary means for supporting said electric heating elements, an arcuate cover member mounted above a portion of said hot plate, electrical heating elements disposed from said cover member and proximate to said hot plate, an electric motor in said cabinet; and gear reduction mechanism gearingly connecting said motor and said vertical shaft whereby said shaft and hot plate may be selectively rotated.

4. A meat frying machine comprising a housing forming a cabinet or the like; an intermediate horizontally extending supporting member in said cabinet, a journalling bearing on said intermediate member; a vertically extending shaft having its lower end journalled in said bearing, the upper end of said shaft extending above said cabinet; means for journalling the upper portion of said shaft; a rotatable hot plate removably and rotatably mounted on the upper end of said shaft, said hot plate including a central flanged hub; a slip clutch on the upper end of said shaft and normally engaging said hot plate hub to transmit rotative movement thereto, said clutch permitting free manual rotation of said hot plate in either direction; electrical heating elements for heating said hot plate, certain of said elements being mounted below said hot plate and other of said elements being above the same; means for supporting said electric elements and a substantially flat cover member mounted above a part of said hot plate; electric contact switches for each of said heating elements, an electric motor in said cabinet; and gear reduction mechanism gearingly connecting said motor and said vertical shaft whereby said shaft and hot plate may be selectively driven and rotated.

5. A meat frying machine comprising a housing forming a cabinet or the like; an intermediate horizontally extending supporting member in said cabinet, a journalling bearing on said intermediate member; a vertically extending shaft having its lower end journalled in said bearing, the upper end of said shaft extending above said cabinet; means for journalling the upper portion of said shaft; a rotatable hot plate removably and rotatably mounted on the upper end of said shaft, said hot plate including a central hub having depending flanges; a slip clutch on the upper end of said shaft and normally engaging said hot plate hub to transmit rotative movement thereto, said clutch including a grooved annular flange releasably engaging said hub flanges, permitting free manual rotation of said hot plate in either direction; electrical heating elements mounted adjacent said hot plate; means for supporting said electric heating elements, an arcuate cover member mounted above a portion of said hot plate; electric contact switches for each of said heating elements, an electric motor in said cabinet; and gear reduction mechanism gearingly connecting said motor and said vertical shaft whereby said shaft and hot plate may be selectively rotated, and a pivotally mounted arm above said hot plate adapted to remove the fried objects from said hot plate.

6. A meat frying machine comprising a housing forming a cabinet or the like; an intermediate horizontally extending partition member in said cabinet, a journalling bearing on said intermediate member; a vertically extending shaft having its lower end journalled in said bearing, the upper end of said shaft extending above said cabinet; means wherein the upper portion of said shaft is journalled; a rotatable hot plate removably and rotatably mounted on the upper end of said shaft, said hot plate including a central flanged hub; a slip clutch on the upper end of said shaft having a grooved flange and adapted to normally engage said hub flanges to transmit rotative movement thereto, said clutch permitting free manual rotation of said hot plate in either direction; a stationary cover member over a part of said hot plate, electric heating elements disposed adjacent the lower surface thereof and in close proximity to said rotatable hot plate; means for supporting said electric heating units; electric control switch means for each of said heating elements; depending peripheral flanges formed integrally with said cover member and adapted to retard the escape of heat from about said heating elements; an annular depending peripheral skirt formed integral with said hot plate and adapted to obstruct the escape of heat from about the heating elements; power driven means for driving said shaft and hot plate; and means for removing hamburger and the like from said hot plate and disposed radially and tangentially over said hot plate and having one end secured to said cover member.

7. A meat frying machine comprising a housing forming a cabinet or the like; an intermediate horizontally extending partition member in said cabinet; a journalling bearing on said intermediate member; a vertically extending shaft having its lower end journalled in said bearing, the upper end of said shaft extending above said cabinet; means wherein the upper portion of said shaft is journalled; a rotatable hot plate removably and rotatably mounted on the upper end of said shaft, said hot plate including a central flanged hub; a slip clutch on the upper end of said shaft having a grooved flange and adapted to normally engage said hub flanges to transmit rotative movement thereto, said clutch permitting free manual rotation of said hot plate in either direction; electrical heating units mounted below and adjacent said hot plate; a plurality of heating units secured adjacent the under side of the stationary cover member, each of said heating units comprising an arcuate refractory flat member having a plurality of connected slots therein means for supporting said electric heating unit, an electric resistance wire secured along said slots; electric control switch means for each of said heating elements; depending peripheral flanges formed integrally with said cover member and adapted to retard the escape of heat from about said heating elements; an annular depending peripheral skirt formed integral with said hot plate and adapted to obstruct the escape of heat from about the heating elements; power driven means for driving said shaft and hot plate; and means for removing hamburgers and the like from said hot plate and disposed radially and tangentially over said hot plate and having one end secured to said cover member.

8. A meat frying machine comprising a housing forming a cabinet or the like; an intermediate horizontally extending partition member in said cabinet, a journalling bearing on said intermediate member; a vertically extending shaft having its lower end journalled in said bearing, the upper end of said shaft extending above said cabinet; means wherein the upper portion of said shaft is journalled; a rotatable hot plate removably and rotatably mounted on the upper end of said shaft, said hot plate including a central flanged hub; a slip clutch on the upper end of said shaft having a grooved flange and adapted to normally engage said hub flanges to transmit rotative movement thereto, said clutch permitting free manual rotation of said hot plate in either direction; electrical heating units mounted below and adjacent said hot plate; a plurality of heating units on the under side of said stationary cover member, each of said heating units comprising an arcuate relatively flat member having a plurality of bevelled grooves therein means for supporting said electric heating units, each said grooves being narrower adjacent to the lower surface of said flat member, a plurality of apertured hangers having tongues on two opposite sides thereof engageable with said bevelled grooves whereby a plurality of said hangers may be removably suspended from said bevelled grooves respectively in spaced apart relation; and a continuous electrical resistance wire extending through said apertures of said hangers; electric connections connected to one end of said resistance wires and adapted to be connected to an electric energy source; electric control switch means for each of said heating elements; depending peripheral flanges formed integrally with said cover member and adapted to retard the escape of heat from about said heating elements; an annular depending peripheral skirt formed integral with said hot plate and adapted to obstruct the escape of heat from about the heating elements; power driven means for driving said shaft and hot plate; and means for removing hamburgers and the like from said hot plate and disposed radially and tangentially over said hot plate and having one end secured to said cover member.

9. In combination with a meat frying machine including a cabinet, a driven rotatable hot plate; an electric motor for driving the same, power transmission mechanism connecting said motor and said hot plate; a plurality of heating units mounted adjacent the lower surface of said hot plate separate upper heating elements mounted adjacent to and above the upper surface thereof, each of said heating units comprising a substantially flat supporting member having a plurality of bevelled grooves, a plurality of non-conductive apertured hangers releasably engaging said grooves, and an electrical resistance wire carried by said hangers; electrical connections whereby said resistance wires may be connected to an electric energy source; and control switches in said electrical connections.

10. In combination with a meat frying machine including a cabinet, a driven rotatable hot plate, an electric motor for driving the same, power transmission mechanism connecting said motor and said hot plate; a plurality of heating units mounted below said hot plate, each of said heating units comprising an arcuate relatively flat member having a plurality of bevelled grooves therein, each of said grooves being narrower adjacent to the lower surface of said flat member, a plurality of apertured hangers having tongues on two opposite sides thereof engageable with said bevelled grooves whereby a plurality of said hangers may be removably mounted in said bevelled grooves respectively in spaced apart relation; and a continuous electrical resistance wire extending through said apertures of said hangers; electric connections connected to one end of said resistance wires and adapted to be connected to an electric energy source; and electric control switches in said electric connections.

11. A hamburger frying machine, comprising a cabinet having separate upper and lower compartments therein separated by an intermediate wall, a circular hot plate rotatably mounted thereon, a vertically extending shaft on which said hot plate is mounted, an electric motor in said upper compartment, gear means on said shaft; gear reduction mechanism connecting said motor and said gear means and adapted to drive said shaft; electrical heating elements mounted adjacent and beneath said hot plate; a stationary hot plate above said first mentioned hot plate; a plurality of electric heating elements adjacent said stationary hot plate; a heat retaining pivotally mounted cover plate above said stationary hot plate and forming auxiliary food receptacles and containers; and independent switch means electrically connected to each of said heating elements.

12. A hamburger frying machine, comprising a cabinet having separate upper and lower compartments therein separated by an intermediate wall, a circular hot plate rotatably mounted thereon, a vertically extending shaft on which said hot plate is mounted; a slip clutch on the upper end of said shaft and normally releasably and rotatably connecting said shaft and said circular hot plate, said slip clutch permitting manual rotation of said hot plate in either direction; an electric motor in said upper compartment, gear means on said shaft; gear reduction mechanism connecting said motor and said gear means and adapted to drive said shaft; electrical heating elements mounted adjacent and beneath said hot plate; a stationary hot plate above said first mentioned circular hot plate; a plurality of electric heating elements adjacent said stationary hot plate; a heat retaining pivotally mounted cover plate above said stationary hot plate; and independent switch means electrically connected to each of said heating elements.

13. In a hamburger frying machine, a cabinet having a stationary top and an upwardly exposed upper compartment, a horizontally disposed intermediate supporting member in said cabinet; a rotatably mounted vertical shaft, means wherein the lower end of said shaft is journalled; a gear wheel on said shaft; an electric motor in said cabinet, gear reduction mechanism drivingly connecting said motor and said gear wheel; a slip clutch on the upper end of said shaft; a rotatable removable hot plate on said slip clutch, said clutch normally transmitting rotation from said shaft to said hot plate; electrical units mounted adjacent said hot plate; an upper stationary heating plate disposed over a part of said rotatable hot plate; electrical heating units secured adjacent to said stationary heating plate, said rotatable hot plate and said stationary hot plate being substantially parallel and a relatively short distance apart; and an independent electric switch electrically connected to each of said heating units to permit selective use thereof.

14. In combination, a meat frying machine including a cabinet, a horizontal rotatable hot plate, said plate being mounted centrally to permit free manual rotation thereof in either direction; and a plurality of electrically connected heating units mounted above and below said hot plate, each of said heating units comprising a slotted plate, a plurality of removable wire hanging and mounting elements releasably engaging said slotted plate and electrical resistance wire engaging said hangers and connected in circuit with a source of electric power; and control switch means for said heating units respectively.

15. In combination, a meat frying machine including a cabinet, a horizontal rotatable hot plate, said plate being mounted centrally to permit free manual rotation thereof in either direction; and a plurality of electrically connected heating units mounted above and below said hot plate, each of said heating units comprising a slotted plate, a plurality of removable wire hanging and mounting elements releasably engaging said slotted plate; electrical wiring for connecting said heating units to a source of electrical energy; openable conduits enclosing portions of said electrical wires leading from said heating units; and control switches for said heating units respectively.

WEBSTER A. PARR.